United States Patent [19]

McKinney et al.

[11] 4,418,083

[45] Nov. 29, 1983

[54] PROCESS OF MAKING HOLLOW DRIED GRAPE

[75] Inventors: Howard F. McKinney; Frederick C. Wear, both of St. Louis County; Harold L. Sandy, St. Charles, all of Mo.

[73] Assignee: McDonnell Douglas Corporation, St. Louis, Mo.

[21] Appl. No.: 403,141

[22] Filed: Jul. 29, 1982

Related U.S. Application Data

[63] Continuation-in-part of Ser. No. 167,688, Jul. 11, 1980, abandoned.

[51] Int. Cl.³ .......................... A23B 7/00; A23L 3/26
[52] U.S. Cl. ........................................ 426/242; 34/15;
426/447; 426/640
[58] Field of Search ............... 426/241, 242, 237, 640, 426/615, 443, 447, 384, 385; 34/4, 15; 219/10.55 M, 10.55 R

[56] References Cited

U.S. PATENT DOCUMENTS 2,091,372 8/1937 Moore .............................. 426/447
2,110,184 3/1938 Webb ..................................... 34/15

*Primary Examiner*—Robert A. Yoncoskie
*Assistant Examiner*—George C. Yeung
*Attorney, Agent, or Firm*—Gravely, Lieder & Woodruff

[57] ABSTRACT

A process of drying an intact whole grape having substantially the same configuration as the fresh grape is described. The dried grape has a moisture content (wet basis) of below about 10% and varies from crisp to chewy depending on the time and temperature of drying. The critical step in the process is drying in a vacuum chamber. Preferably the heating medium is microwave energy applied to the grapes in the vacuum chamber.

4 Claims, 1 Drawing Figure

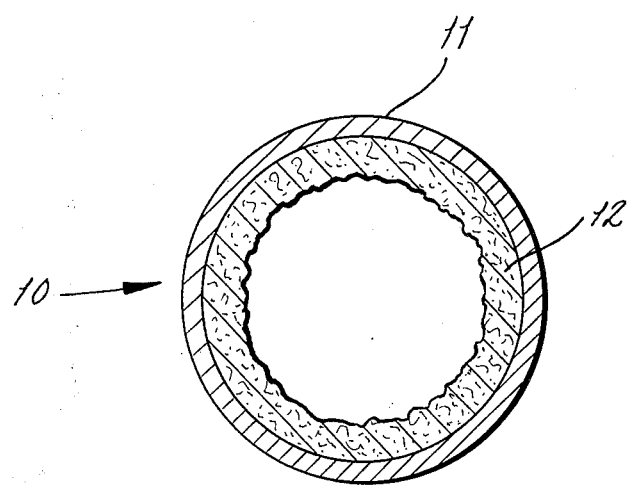

PROCESS OF MAKING HOLLOW DRIED GRAPE

REFERENCE TO PRIOR APPLICATION

This application is a continuation-in-part of our prior co-pending application Ser. No. 167,688 filed July 11, 1980, now abandoned.

BACKGROUND OF THE INVENTION

This invention relates to dried grapes and specifically to a process of drying grapes in a vacuum using microwave energy or thermal radiation to produce a hollow dried grape of generally spherical configuration with an intact skin. Preferably the grapes are dried completely in a non-oxidizing atmosphere to preserve their original skin color and to produce a unique taste.

Raisins are dried grapes in which the meat and skin of the grape have collapsed around the center of the grape as it is dried to produce the wrinkled, prune-like appearance of the conventional raisin. Conventional raisins are made from Thompson seedless grapes. The grapes are green to yellow in color when picked for drying into raisins. Usually the grapes are dried in the field in rows using the heat of the sun. As the grapes dry, they oxidize and turn to the recognizable black or dark brown color normally associated with raisins. At the same time as the grapes dry, they collapse upon themselves around the center of the grape to produce the small, irregularly shaped wrinkled raisin.

There are light colored raisins, known as golden raisins, and these are made by bleaching. The grapes are exposed to concentrated sulfur dioxide vapors. They are then dried artificially. The residual sulfur dioxide inhibits oxidation during the drying process and produces the "golden" product.

Drying grapes in the field makes them subject to the vagaries of the weather and some growers place the picked grapes under a shelter and use hot air to dry the grapes. Neither of these methods is totally satisfactory and both result in a black, inwardly, collapsed, wrinkled raisin.

The present invention produces a puffed or substantially spherical dried grape which is hollow but has approximately the original grape shape. All of the solids in the grape are present and the skin is substantially intact. The color is much lighter than that of a raisin. The dried grape has about 90% or more of the moisture removed and has a sweet, tart flavor. It can be made either chewy or crisp and brittle depending on the temperature to which it is heated and the time for which it is heated. The grape solids are mostly positioned against the inside of the skin.

The dried grape product preferably is produced by drying the grape in a vacuum using microwave energy or thermal heat radiation.

Placing the moist grapes in a vacuum chamber and reducing the chamber pressure causes the moisture to be evolved from the grapes and causes the primary constituent of the atmosphere to be water vapor, with no free oxygen for oxidizing the grapes. Either microwaves or thermal radiation are used to provide the energy input to cause the water to leave the grapes.

The art in Webb U.S. Pat. No. 2,110,184 describes a process of drying fruit or other food products in a duo drying process with a puffing or swelling of the fruit during the second drying step in an effort to retain the original flavor of the fruit. In the Webb process, the fruit initially is treated at a vacuum of 29.5 inches of mercury and a temperature of 300°–320° F. for 20–30 minutes until the temperature of the fruit is 180°–200° F. Then steam or other vapor pressure is admitted to the drying chamber to raise the pressure to 30–45 p.s.i. This is followed by a rapid evacuation of the chamber and the fruit is maintained at 180°–190° F. until it reaches a dry crystalline state. This is stated to take 30–60 minutes. The chamber then is rapidly cooled to cool the fruit to 100°–125° F. to crystallize the sugar and cause the fruit to harden. When the fruit is 100°–125° F. the chamber is gradually pressurized to atmospheric.

Moore U.S. Pat. No. 2,023,536 discloses a process for drying fruit to about 2% moisture. The Moore process involves drawing a vacuum of 25 inches of mercury followed by a steam treatment at 10–15 p.s.i.g. (115° C.) for 2–3 minutes. The pressure is released and a vacuum drawn resulting in a "puffing action" on the fruit or an enlargement of the pores in the fruit. The heat is maintained to reduce the moisture to a desired low level. When whole fruit is used, i.e., prunes, grapes, product is macerated and pressed into cakes for drying. This type of dried fruit is good for use in baking, etc., often being broken into small chips.

Both of the foregoing processes had the disadvantage of requiring expensive equipment and the processes are time consuming, difficult and expensive to operate. The present invention provides a process for producing a dried whole fruit of the same substantial shape as the starting material in an efficient economical process involving only the use of a vacuum chamber combined with microwave energy or thermal radiation as a heat source.

Accordingly, one of the principal objects of the present invention is to provide an economical practical process of producing a dried whole grape having substantially the shape of the original grape with an intact skin using a vacuum drying process.

Still another object of this invention is to provide a process for making a dried non-oxidized grape having a tart sweet flavor and having the original grape shape.

A further object is to provide a process for making a dried substantially spherical shaped whole grape which can be either chewy or crisp depending on the temperature and time of which it is dried.

A still further object is to provide a vacuum drying process using microwave energy or thermal radiation for drying grapes and producing a hollow spherical shaped non-oxidized final product.

These and other objects and advantages will become apparent hereinafter.

SUMMARY OF THE INVENTION

This invention comprises an economical practical process for making a whole dried grape having about the same shape as the original grape using a vacuum process.

DETAILED DESCRIPTION

The drawing is a cross sectional view of a dried grape of this invention.

The dried grape of this invention is useful as a nutritious, natural fruit sugar candy-like snack food, as an adjunct in a breakfast cereal, and in baking.

As may be seen from the drawing, the dried grape 10 comprises an intact relatively smooth outer skin 11 which is relatively spherical in shape and has approximately the same shape and size as the original grape.

The interior of the dried grape 10 is hollow with the meat 12 having migrated and collected adjacent to the inner surface of the skin 11. The moisture content of the dried grape 10 is less than about 10% on a wet basis (W.B). The dried grape 10 has a tart sweet flavor. When the grape is dried at a high temperature for a long time, the product is crisp and brittle. However, when the grape is dried at the low end of the temperature range for a short time, the product is chewy.

The dried grapes preferably are made from fresh Thompson seedless grapes. This type grape also is used to make almost all raisins. However, other type grapes such as Ruby seedless, Flame seedless and Christmas seedless varieties can be used to make different colored products.

PREFERRED PROCESS

The preferred process for producing dried grapes according to this invention has as its first step, the removal of the bloom or wax platelets from the grapes. The phenomenon of "bloom" is discussed in detail in the article by J. V. Possingham entitled "Surface Wax Structure in Fresh and Dried Sultana Grapes", *Ann, Bot.* 36, 993–6 1972. This step is important because it allows the water evaporated from within the grape to diffuse through the grape skin. This procedure is also used in making raisins. The debloom solution is made as follows:

Into water at 120° F. are mixed potassium carbonate (at the rate of 16 lb/100 gallons of water) and methyl oleate (at the rate of 2 gallons/100 gallons of water).

The grapes (with or without capstems) are dipped for no more than 30 to 60 seconds into the foregoing noted composition. The solution can be applied by spraying if desired, but all surfaces must be carefully covered. Other deblooming methods may be used such as hot water dipping and hot caustic dipping.

Preferably, the grapes then are placed in a vacuum chamber and dried to a moisture content below 10% at a pressure between about 5 to about 85 Torr. The last critical step of the process is the drying from about 20% to below about 10% moisture and this must be done in a vacuum on the order of at least 40 Torr or lower.

Optionally, the grapes (containing about 78% moisture) are dried in a conventional heated-air dehydrator to a nominal moisture content of about 40% (but not less than about 20%). This method oxidizes the fruit to a limited degree which is undesirable in certain applications. However, the air drying is less expensive than all vacuum drying and can be used where color and taste are not critical.

In this optional method the partially dried grapes are removed from the conventional heated-air dehydrator and placed in a microwave or thermal vacuum dryer. The vacuum drier is evacuated to a pressure of at least 20 Torr and microwave energy at a power density of about one watt per cubic inch (based on volume of fresh fruit) is applied until the moisture is reduced to below 10% (wet basis). It is believed that the vacuum keeps the grapes puffed out to their original size due to internal vapor pressure of the water boiling out of the grapes. The vacuum also allows the water to boil at a temperature which does not damage the meat or skins of the grapes.

The use of a microwave energy source to heat the grapes is preferred, but other energy sources can be used. It is imperative, however, that the vacuum be used, no matter what the heating method. For example, dried grapes according to this invention can be produced using a vacuum oven and thermal addition. However, such a process is slower and more expensive than the microwave heating process.

A typical thermal radiation chamber uses an open mesh conveyor containing a layer of grapes between heated patens in a vacuum chamber to dry the grapes to the critical moisture level.

The microwave heater can be of the type disclosed in McKinney et al U.S. Pat. No. 4,015,341.

The limitations on the process include using a pressure of between 5 to 85 Torr. For the final drying from 20% to 10% or lower, the pressure must be about 40 Torr, preferably about 25 Torr. Generally the pressure must be low enough so that the steam generated internally in the grape will inflate the grape and hold it in its original shape until the sugar in the meat is dry enough to form a rigid structure that will support the grape skin in its original shape. The pressure must be below 40 Torr during the final stages of drying (from 20% moisture on down) and the environment must be of low oxygen content (2% or less) and is primarily water vapor.

The energy density can be as high as 3 watts per cubic inch (based on the volume of the fresh grape) until the moisture is reduced to 15% (wet basis). Between 15% and 12% moisture the power density should be reduced to about 0.5 watts/in$^3$ and from 12% to 10% the power density should be about 0.25 watts/in$^3$.

At the listed power densities the time to dry from 36% moisture to 15% is about 52 minutes, the time from 15% to 12% is about 20 minutes, and from 12% to 9% about 25 minutes. Actual drying times in a microwave chamber will be dependent on microwave coupling efficiency which is controlled by the dryer design.

EXAMPLE NO. 1

Two samples of fresh Thompson seedless grapes weighing 9 lbs. and 8 lbs. are dipped into a solution containing 16# potassium carbonate and two gallons methyl oleate per 100 gallons of water. The fruit are broken into singles and clusters and placed on a drying tray in a heated-air dryer. The grapes are air dried for 8 hours at about 100° F. air temperature. When the grapes are weighed the average moisture content (W.B.) of the two specimens is 40.63% after the initial air drying, whereas the initial moisture content of the fresh fruit is 78%. The partially dried fruit is placed in a microwave vacuum dryer of the type shown in U.S. Pat. No. 4,015,341. The fruit is dried for 155 minutes using 720.9 watt hours under a vacuum of 14 to 39 Torr in the microwave dryer. The final moisture content of the fruit is <9.0%. The product is dry and the fruit is expanded but not sticky. It is amber-brown in color with a tough skin. The fruit is meaty and tart and stuck to the teeth when chewed.

EXAMPLE NO. 2

18.235 lbs. of fresh Thompson seedless grapes are dipped into an anti-bloom solution similar to that described in Example No. 1. The dipped fruit is placed in a heated-air dryer for 8 hours at 160° F. air temperature. When the grapes are removed from the drier they have a moisture content of about 35.1%. The partially dried berries are placed in a vacuum microwave dryer of the type described in U.S. Pat. No. 4,015,341 under a pressure of 14.5 to 34 Torr for 98 minutes. The final product has a moisture content of 9.6% and is a beautiful golden brown and evenly dried. The product is dry, hard, non-sticky and, non-shiny. Some are crunchy like a dried breakfast food. Following is a table showing the data taken during the drying procedure of Example No. 2.

| Actual Time | Pressure Torr | Microwave Watts (Net) | Accumulated Watt-Hours |
|---|---|---|---|
| 08:37 | 33 | 850 | 0 |
| 08:39 | 31 | 840 | 28 |
| 08:46 | 31 | 850 | 127 |
| 09:06 | 31 | 840 | 409 |
| 09:16 | 33 | 830 | 547 |
| 09:22 | 34 | 835 | 631 |
| 09:29 | 28 | 250 | 728 |
| 09:41 | 24 | 250 | 778 |
| 09:49 | 23 | 210 | 806 |
| 09:50 | 23 | 100 | 806 |
| 10:02 | 18.5 | 100 | 826 |
| 10:15 | 14.5 | 100 | 847 |

To summarize the foregoing, the essence of the process for producing puffed grapes of all varieties is 1. Drying the grape to below 10% moisture content. The last portion of the drying (from about 20% down) must be done at a pressure on the order of 40 Torr or lower.

The low environmental pressure, coupled with temperatures in excess of 100° F. inflate the fruit with steam and cause it to retain this shape as the last of the water is being removed.

The initial dry down (from the fresh state to about 20% moisture) can be accomplished in air at atmosphere pressure. However, the presence of oxygen in the drying enviroment produces a dark oxidized color and raisin-like taste. If the light or natural color of the original fruit is to be retained, and an oxidized flavor is to be avoided, the drying must be accomplished in an environment that is essentially oxygen-free. When grapes are dried from the fresh state in a vacuum chamber the environment is essentially oxygen-free. The primary atmospheric constituent is water vapor (about 95% or more). The next most abundant constituent is nitrogen (about 4%); the oxygen concentration is on the order of 1%.

The initial drying could be in a non-oxidizing atmosphere such as a nitrogen or other inert gaseous atmosphere.

2. During the last part of the drying the temperature of the fruit must rise to between 170° F. and 200° F. and remain there for some time to produce a carmelization of the fruit sugars.

Carmelization proceeds at varying rates depending upon the temperature of the sugar. It proceeds at a barely detectable rate below 160° F. but proceeds very rapidly at temperatures above 200° F.

The peak temperature achieved and the retention time at this temperature depends on the desired character of the product. Finishing temperatures toward the low end of the range and time-at-temperature on the order of 30 minutes or less tend to produce a chewy, fruit product. Temperatures toward the high end of the range and time-at-temperature exceeding 30 minutes tend to produce a crisp, brittle, candy-like product.

3. The final essential step is cooling the product to about 100° F. or lower while retaining the product at the low pressure. This causes the sugars and carmelized sugars to harden and produce a firm structure that retains the original shape and size of the product during the repressurization to atmosphere pressure. A rapid cooling is desirable if this can be achieved as it produces a sharply defined end to the carmelization process.

What is claimed is:

1. A process for making dried grapes comprising the steps of:
    (a) removing bloom from fresh grapes,
    (b) drying the grapes from about 20% moisture to less than about 10% moisture in an environment containing less than about 2% oxygen and at a pressure of less than about 40 Torr,
    (c) raising the temperature of the grapes to between about 170° F. to about 200° F. in said reduced pressure environment for a time sufficient to rigidify the sugar structure in the grapes,
    (d) cooling the grapes to below about 100° F. while maintaining said reduced atmosphere, and
    (e) recovering hollow substantially round intact grapes having substantially the same size and color as the fresh grapes.

2. The process of claim 1 wherein the recovered grapes are chewy.

3. The process of claim 1 where the recovered grapes are crisp and brittle.

4. The process of claim 1 wherein microwave energy is applied to the grapes in the reduced pressure environment to dry the grapes.

* * * * *